May 15, 1934.  H. O. KITTELSON  1,959,208
MILK TESTER
Filed May 13, 1932  2 Sheets-Sheet 1
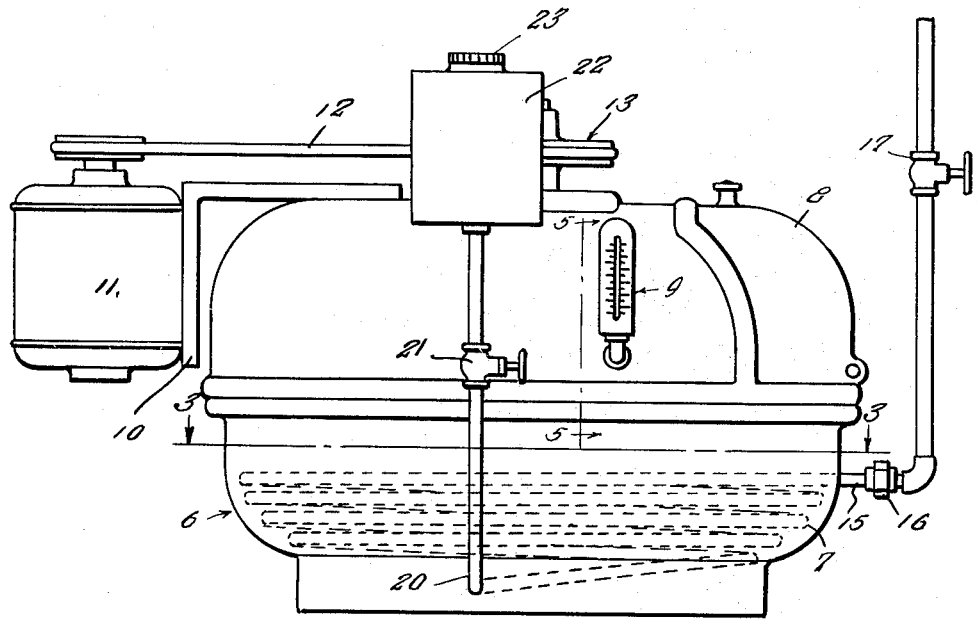
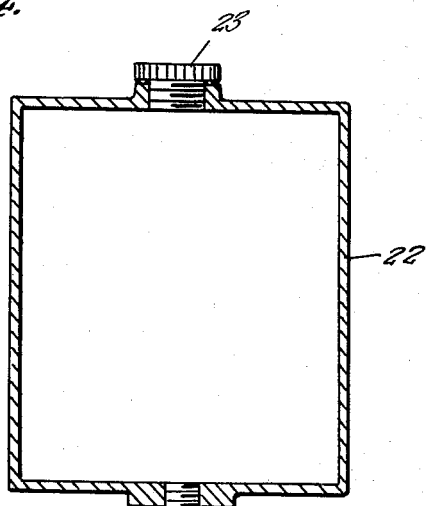
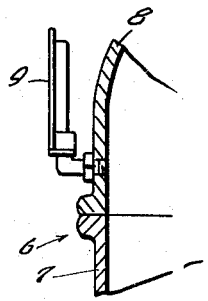
Inventor
Harry O. Kittelson
By Clarence A. O'Brien
Attorney

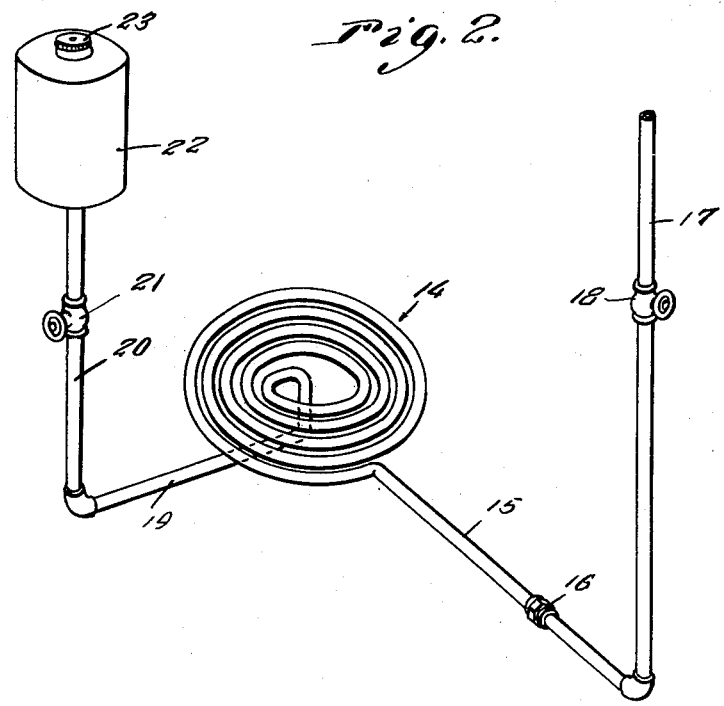
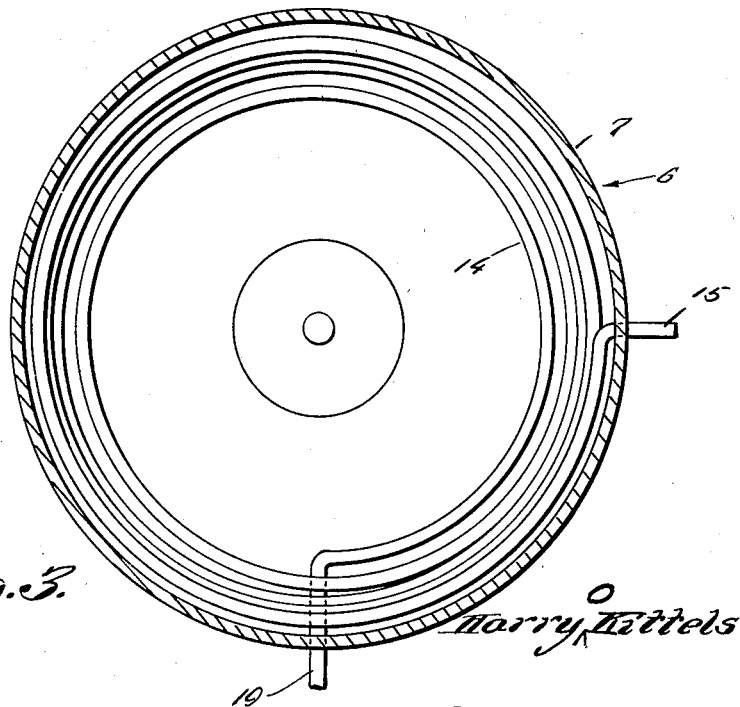

Patented May 15, 1934

1,959,208

UNITED STATES PATENT OFFICE 1,959,208

MILK TESTER

Harry Oscar Kittelson, Veblen, S. Dak.

Application May 13, 1932, Serial No. 611,228

1 Claim. (Cl. 23—258)

This invention relates to an improved milk tester of the type designed to accurately test the consistency and quality of different grades of milk by separating the butter fat from the casein to ascertain the relative proportions of each in a given quantity of milk.

It is substantially conventional in this line of endeavor to use the well known acid test and to accomplish this while the milk containers are rotated in a manner to utilize centrifugal force for the separating action, the containers being subjected to the action of heat (generally steam) while the test is being made.

The present improvement has to do with a specifically new heater for use in conjunction with a milk tester, said heater being considered to be more practical and efficient for use in a machine of this type.

In the drawings:

Figure 1 is a side elevational view of a milk testing device or machine embodying the invention.

Figure 2 is a perspective view of the invention per se.

Figure 3 is a horizontal sectional view on the line 3—3 of Figure 1.

Figure 4 is a vertical sectional view through a part of the invention.

Figure 5 is a detail section taken approximately on the plane of the line 5—5 of Figure 1.

In the drawings, there is shown a milk and cream tester of conventional type including a casing 6 having a lower bowl-like section 7 and a hingedly mounted lid section 8. A thermometer or gauge 9 is provided in this lid section. Supported from a bracket 10 is the propulsion electric motor or steam turbine motor (as desired) 11 for driving the belt 12 which in turn operates the rotor 13 carrying the table (not shown) or other rotary support housed within the casing 6 to support the milk filled containers (also not shown). This device separates the milk from the cream by centrifugal action and forms no part of my invention per se.

The novelty is predicated upon the heater used in combination with the centrifugal tester. This heater, as best seen in Figure 2, comprises a coiled heat radiator 14 which may be made of a suitable shape and size to fit within the bowl 7 of any milk tester. The numeral 15 designates a steam intake branch which has connection, by way of a suitable union 16 with an upstanding steam delivery or supply pipe 17 which is adapted to be connected to a steam supply pipe.

This pipe 17 is provided with a regulating or cut-off valve 18. A discharge branch 19 of the heating coil 14 is connected with an upstanding outlet pipe 20 having a regulating valve 21 and connected at its upper end to a small tank 22 of the type generally referred to in the trade as a water pot. This tank 22 has a removable closing plug 23 provided with a vent, if desired, and this tank forms part of the tester and I simply use it as a storage tank for receiving the water of condensation passing from the coil 14 and this water may be used for testing purposes.

The steam supplied from a suitable source is delivered through the pipe 17 into the coil 14 and is regulated by the valve 21. This valve 21 regulates the passage of fluid through the vertical outlet pipe 20 so that the steam condenses into hot water before or during its passage through the uppermost part of the coil 14. The valve 18 may be used if desired to assist in producing this condensation but it is chiefly used to cut-off all supply of fluid to the coil. By regulating the valve 21 and causing condensation of the steam into water thereby, it will be seen that the temperature within the centrifugal tester can be accurately regulated without danger of overheating the same as is liable to be the case when free steam is introduced either directly into the tester or allowed to pass directly through the coil 14 without condensation. By observing the thermometer 9 and regulating the flow of fluid through the vertical outlet pipe 20 through the medium of the valve 21, the tester can be maintained at all times at the proper temperature for testing purposes.

When my coil 14 is used with a centrifugal milk tester, the attendant can obtain a correct milk or cream test more accurately and with less labor than previously. In many States, the test is required to be read when the milk or cream is 120 to 130° F. When steam is admitted to the bowl of the tester to freely mix with the air therein as in many of the testers now on the market, it is exceedingly difficult to maintain the temperature of the tester substantially constant and condensation from the free steam is liable to mix with the milk or cream to give inaccurate results while dampening the entire bowl of the tester. With my construction as used, no free steam is admitted to the bowl, the tester may be maintained at the proper temperature for reading the test and labor is saved inasmuch as it is not necessary to utilize a hot water bath for securing the proper temperature of the milk or cream to read the test after the butter fat has been separated through the centrifugal action of the tester.

It will, of course, be understood that various changes may be made in the form, details, arrangement and proportions of the various parts without departing from the scope of the present invention, which generally stated, consists in the matter shown and described and set forth in the appended claim.

I claim:

The combination of a centrifugal milk testing machine having a bowl, a tubular coil having no communication with said bowl and mounted therein, said coil having an inlet and outlet, a steam supply pipe connected to the inlet of said coil, a vertical outlet pipe connected to the outlet of said coil and running upwardly therefrom and a valve in said outlet pipe controlling the flow of fluid therethrough to condense the steam into water as it enters the coil and control the temperature in said machine.

HARRY OSCAR KITTELSON.